May 26, 1970  KEIZO SHIMANO ET AL  3,513,725
FREE WHEEL ASSEMBLY FOR BICYCLE EQUIPPED WITH
AUTOMATIC SPEED CHANGE MECHANISM
Filed July 15, 1968  2 Sheets-Sheet 2
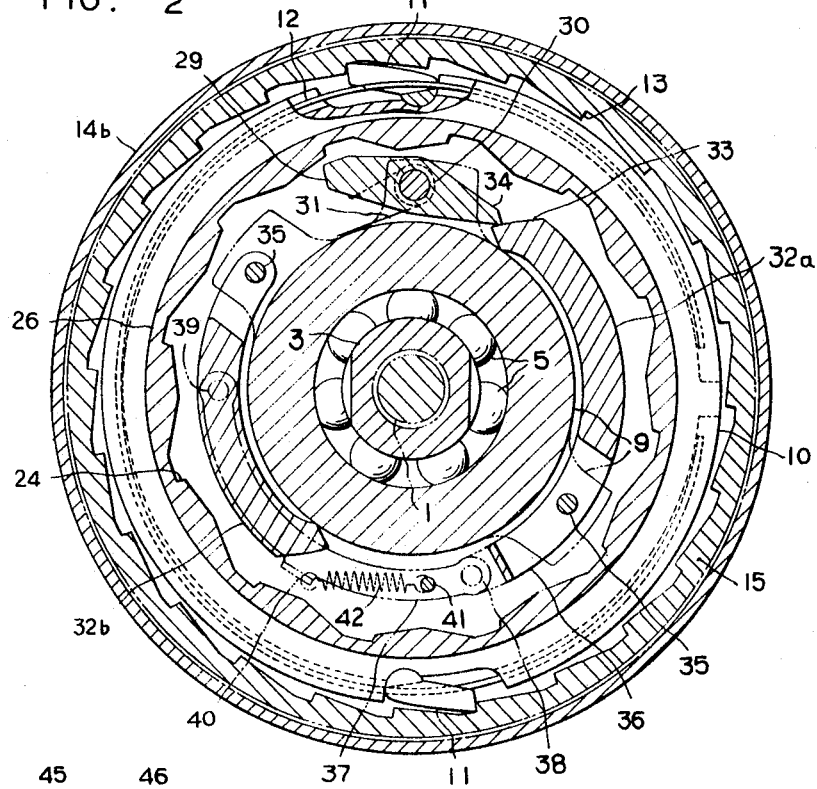
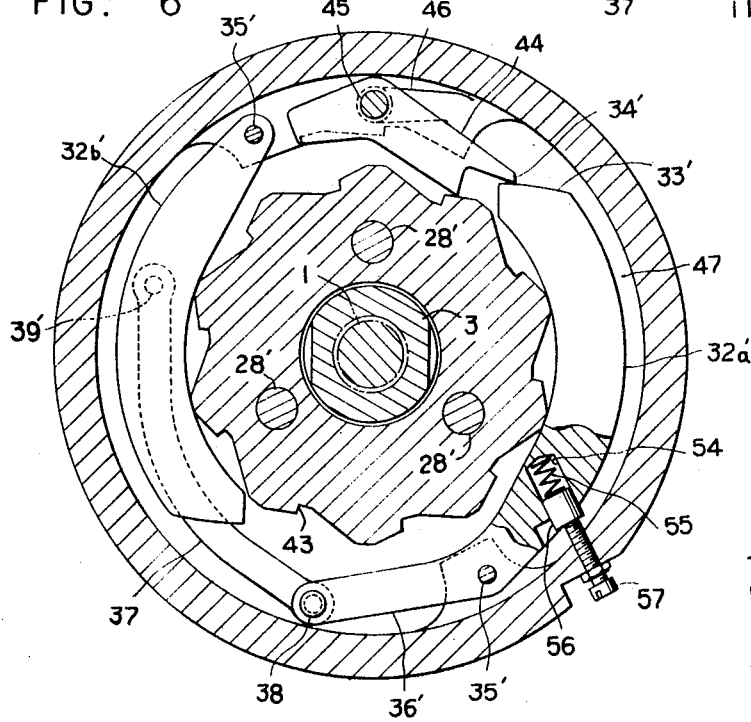
KEIZO SHIMANO,
TAKASHI SEGAWA AND
MASASHI NAGANO,
INVENTORS
BY Wenderoth, Lind & Ponack.
ATTORNEYS United States Patent Office 3,513,725
Patented May 26, 1970

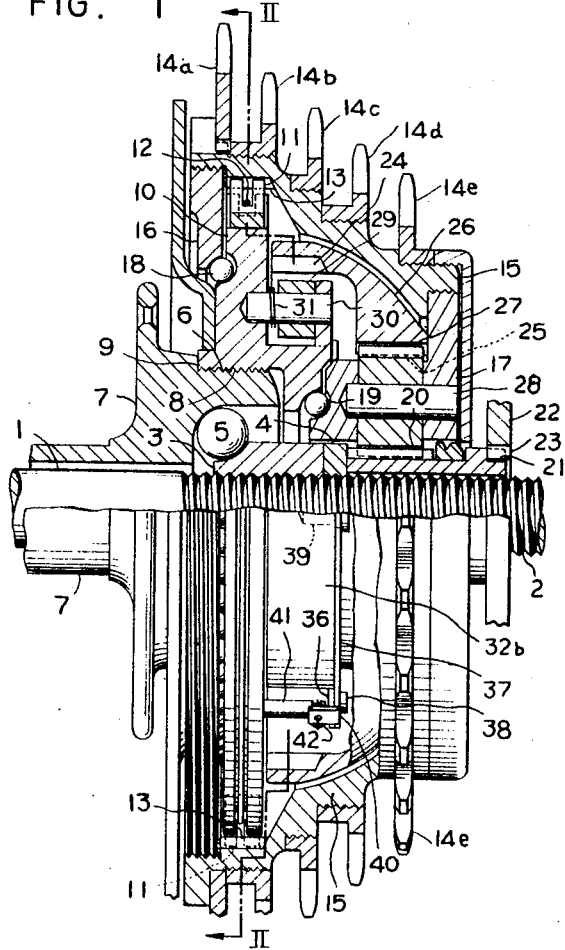

3,513,725
FREE WHEEL ASSEMBLY FOR BICYCLE EQUIPPED WITH AUTOMATIC SPEED CHANGE MECHANISM
Keizo Shimano, Takashi Segawa, and Masashi Nagano, Sakai, Osaka, Japan, assignors to Shimano Kogyo Kabushiki Kaisha, Osaka, Japan
Filed July 15, 1968, Ser. No. 744,805
Claims priority, application Japan, Aug. 8, 1967, 42/50,814
Int. Cl. F16h 3/74
U.S. Cl. 74—752         3 Claims

ABSTRACT OF THE DISCLOSURE

This invention relates to a multistage free wheel assembly having a plurality of driving sprocket wheels of different number of teeth adapted to be selectively put into operation being engaged by a driving chain, and provided within the assembly with the sprocket wheel carrier and two kinds of speed-ratio transmission ratchet gearings, one of which a high speed-ratio transmission ratchet gearing, and said high speed-ratio transmission ratchet gearing is associated with oscillatable centrifugal governor weights adapted for bringing said ratchet gearing into or out of operative engagement, so that the speed-ratio transmission condition is automatically changed-over to low speed-ratio or to high speed-ratio transmission condition.

---

It has been proposed a so-called exposed speed change mechanism for a bicycle, wherein a plurality of driving sprocket wheels of different number of teeth are provided on a free wheel assembly and adapted to be selectively put into operation by manual change-over of the engagement of a driving chain with any desired sprocket wheel. The selection of the appropriate sprocket wheel requires considerable skill of the bicycle driver. As it is not possible to effect change-over of the speed-ratio when the bicycle is stopped. Usually, when the bicycle is stopped, the speed-ratio condition of the bicycle is held same as the condition during running just before the bicycle is stopped. Under the circumstance, it would happen that the driver starts driving of the bicycle, with the high speed-ratio transmission condition, irrespective of the driver's will. Thus, the next driving is started under the high speed-ratio condition. Consequently, it necessitates greater torque for driving at start of the bicycle driving.

An object of this invention is to provide a new and improved speed change mechanism of the aforementioned type, in which such disadvantages of conventional device are removed. Other objects will appear from the subjoined detail description of the embodiments of the invention illustrated in the accompanying drawings, in which:

FIG. 1 is a side view, one half being longitudinal section of the multi-stage free wheel assembly according to this invention;

FIG. 2 is a cross section taken along line II—II of FIG. 1, parts being shown under low speed-ratio transmission condition;

FIG. 3 shows another cross section of FIG. 1, parts being shown under high speed-ratio transmission condition;

FIG. 4 is a side view and longitudinal section of modified form of the device of this invention;

FIGS. 5 and 6 are cross sections taken along lines V—V and VI—VI, respectively, of FIG. 4.

Referring to FIG. 1, a rear dead axle 1 of bicycle has screw threaded end portion 2 at either ends. At the righthand end of the axle 1, there is thread fitted an inner race cone 3 rigidly held by means of a lock nut 4. A hub 7 has at its righthand end a mounting screw 6 having outer bearing race for the bearing balls 5. Similarly as in the conventional bicycle hub. A driven member on drum 9 having internal screw thread 8 is thread fitted on the hub 7, and on an annular ridge 10 of said driven member 9 there are provided driving pawls 11 adapted to be erected by the action of a spring 12 (FIGS. 1 and 2). 15 is a sprocket wheel carrier frame, having an internal ratchet wheel 13 (FIG. 2) and carrying a plurality of sprocket wheels 14a, 14b, 14c, 14d and 14e of different number of teeth, the sprocket wheel 14a having greatest number of teeth (i.e. the lowest speed-ratio sprocket wheel) being disposed at the innermost position and the other sprocket wheels being disposed shifted outwardly in the order of the number of teeth thereof. The sprocket wheel carrier 15 is supported by means of inner and outer bearings 16 and 17 on said driven drum 9, as supported by balls 18 and 19, the arrangement being such that one way power transmission can be obtained, similarly to the conventional arrangement of this type of so-called exposed multistage speed change mechanism for bicycle.

In the embodiment of this invention shown in FIGS. 1 to 3, a sun gear 20 is securely mounted on a bush thread fitted to the righthand end portion of said dead axle 1, which bush has a recess 21 engaging with a slot 23 of a rear solid end 22 of a bicycle. 26 is an internal gear carrier body, in the inner wall of which there are formed an internal ratchet wheel 24 at the lefthand portion and an internal gear 25 at the righthand portion, the internal gear 25 being in indirect engagement with said sun gear 20. Between the sun gear 20 and the internal gear 25, there are a plurality of planetary pinions 27, each rotatably mounted on an axis 28 supported by said bearing 17, whereby forming a planetary gear mechanism. On the driven member 9, there is mounted a high speed-ratio transmission driving pawl 29 oscillatably mounted on a pivot 30. The driving pawl 29 is biased by a spring 31 in the direction for bringing its tip into operative engagement with the internal ratchet wheel 24. On the driven member 9, there are main and auxiliary centrifugal governor weights 32a and 32b, respectively, oscillatably mounted as at 35. Said governor weights are arranged in symmetrical relation with respect to the axis of the hub, and so arranged that the arcuate abutting face 33 (FIG. 2) at the tip of the main governor weights 32a is facing to the tail 34 of the high speed-ratio transmission driving pawl 29, and that both governor weights 32a and 32b are adapted to be simultaneously oscillated outwardly or inwardly. The tail end 36 of the main governor weights 32a is connected to the auxiliary governor weights 32b by means of a link 37 linked by pivots 38 and 39. The link 37 has a hook 40 which is connected by means of a tension spring 42 to a hook 41 fixed to the driven member 9, thereby giving a tendency of normally pulling the tips of the governor weights 32a and 32b toward the axis of the hub. Thus, so far as the speed of rotation of the driven member 9 is lower than a predetermined speed, the governor weights 32a and 32b are held oscillated inwardly toward the axis of the hub against the action of centrifugal force, and the abutting face 33 of the main governor weight 32a is held abutting against the tail 34 of the driving pawl 29, so that the tip of the pawl will not be brought into operative engagement with the internal ratchet wheel 24. On the contrary, when the speed of rotation of the driven member 9 is increased, the governor weights 32a and 32b will be outwardly oscillated against the action of said tension spring 42, whereby the tail 34 of the driving pawl 29 will be automatically released from the main governor weight 32a, so that the tip of said driving pawl 29 will be brought into operative engagement with the ratchet wheel 24 (FIG. 3).

When the rotating speed of the driven member or of the hub 7 is comparatively low, for instance at start of driving the bicycle, the high speed-ratio transmission ratchet gearing is in inoperative position, and the rotation of the sprocket wheel carrier 15 is transmitted to the hub 7 through the internal ratchet wheel 13, the driving pawl 11, and the driven member 9. When the rotation speed of said hub 7 is increased and the governor weights 32a and 32b are outwardly oscillated, whereby the pawl 29 is brought into operative engagement with the internal ratchet wheel 24, rotation of the sprocket wheel carrier 15 is transmitted to the hub 7 through the increased speed-ratio transmission route, through the bearing 17, the planetary pinions 27, the internal gear 25, the internal ratchet wheel 24, the high speed transmission driving pawl 29 and the driven member 9. Under such high speed ratio transmission condition, the pawls 11 are in operative engagement with the internal ratchet wheel 13, but the driven member 9 with said driving pawls 11 will rotate at speed higher than the sprocket wheel carrier 15, so that it is not substantially effective.

FIGS. 4 to 6 show another embodiment of this invention, wherein a bicycle driving is started under low speed-ratio transmission condition, i.e. the direct transmission route. Due to the substantial identity of the arrangement of the free wheel hub in this embodiment and that illustrated in FIGS. 1 to 3, this embodiment will be described by corresponding or primed reference numerals. The driven member 9' has its inner wall 8' screw threaded and on its outer periphery it has a ratchet wheel 43. Said driven member 9' is screw thread fitted with the screw thread 6 on the hub 7. A driving pawl 44 pivoted on as pin 45 is provided and adapted to be brought into operative engagement with said ratchet wheel 43. A spring 46 has a tendency of bringing the nose of the driving pawl 44 into engagement with the ratchet wheel 43. The sprocket wheel carrier 15' is supported by a ball bearing 47 comprising balls 18' and bearing race 48 and balls 19', and it is provided with a plurality of sprocket wheels 14a', 14b', 14c', 14d' and 14e' of different diameter or different number of teeth. Said sprocket wheel carrier 15' is adapted for one way rotation, being provided with a ratchet gearing comprising a driving pawl 44 and the ratchet wheel 43.

On the righthand end portion of the dead axle 1, there is thread fitted a sun gear 20' which is securely held by a distance piece 49 and a nut 50. In the sprocket wheel carrier 15', there is an internal gear 25' and, between said internal gear and the sun gear 20', there are plurality of planetary pinions 27', each loosely mounted on an axis 28', and carried by the driven member 9', whereby forming a planetary gear mechanism. On the outer periphery of said internal gear 25', there are a plurality of low speed-ratio driving pawls 51 adapted to be erected by means of a spring 52. The inner wall of the sprocket wheel carrier 15' is formed into an internal ratchet wheel 53 which is adapted to cooperate with said low speed-ratio driving pawls 51. With respect to the sprocket wheel carrier 15', at the lefthand position in the vicinity of the driving pawl 44' there are the main and auxiliary centrifugal governor weights 32a' and 32b', respectively, so arranged that the arcuate abutting face 33' of the main governor weight 32a' project into the position facing to the nose 34' of the tip of the pawl 44, and that the both governor weights are arranged in symmetrical position relative to the axis of the hub and both oscillatably mounted on pins 35'. The tail 36' of the main governor weight 32a' and the auxiliary governor weight 32b' are connected by a link 37' and pins 38' and 39'. The main governor weight 32a' has a hole 54 (FIG. 6) in the vicinity of the pivot 35', in which a spring 55 and a movable plug 56 are inserted. 57 is an adjustable screw. By said means, the governor weights 32a' and 32b' are given a tendency of oscillating inwardly with respect to the axis of the hub by the action of the spring 55. When the speed of rotation of the sprocket wheel carrier 15' is lower than a predetermined speed, the governor weights are maintained oscillated inwardly against the action of centrifugal force, and the tail 34' of the high speed-ratio driving pawl 44 is supported by the abutting face 33' of the main governor weight 32a', so that said pawl 44 is held in the position out of operative engagement with the ratchet wheel 43. Upon increase of speed of rotation of the sprocket wheel carrier 15', the governor weights 32a' and 32b' are oscillated outwardly against the action of the spring 55, whereby the tail 34' of the pawl 44 will be automatically released from suppression of the abutting face 33' of the governor weight 32a', so that said pawl 44 will be brought into operative engagement with the ratchet wheel 43.

When the sprocket wheel carrier 15' is driven at comparatively low speed, the transmission of power to the hub 7 is effected under low speed-ratio transmission condition, with the high speed transmission ratchet gear held in inoperative position and through the internal ratchet wheel 53, the low speed-ratio driving pawls 51, the internal gar 25', the planetary pinions 27' and the driven member 9'. Upon increase of rotation speed of the sprocket wheel carrier 15', the high speed-ratio driving pawl 44 is brought into operative engagement with the ratchet wheel 43, and the rotation of the sprocket wheel carrier 15' will be transmitted through direct transmission route comprising the driving pawl 44, the ratchet wheel 43 and the driven member 9', whereby driving the hub 7 under high speed-ratio transmission condition. Under such high speed-ratio transmission condition, the low speed-ratio driving pawls 51 are in operative engagement with the internal ratchet wheel 53, but the internal gear 25' is not substantially effective, since it rotates at speed higher than the sprocket wheel carrier 15'.

With respect to the aforementioned two embodiments of this invention, when the driving speed is decreased under the high speed-ratio transmission condition, the centrifugal governor weights will be returned to the initial inwardly oscillated position. But, the high speed-ratio driving ratchet gear would not be released merely by the fact that said governor weights have been returned to the initial ineffective position. For the purpose of releasing such operative engagement, the bicycle driver must decrease the speed of pedalling, whereby the driving pawl 29 and the high speed ratchet wheel 24 are rotated in the reverse direction, so that the driving pawl 29 is released from the ratchet wheel 24, allowing the tail 34 suppressed by the abutting face 33 of the main governor weight 32a.

From the foregoing it will be seen, according to the present invention, that the multi-stage speed change mechanism comprises a driving sprocket wheel carrier, a driven member, a ratchet gear for transmitting rotation of said sprocket wheel carrier to said driven member through direct transmission route, a planetary gear mechanism for speed change, and other ratchet gear for transmitting rotation of said planetary gear speed change mechanism, and centrifugal governor weight for bringing into operative engagement or disengagement of the high speed-ratio ratchet gearing so that the bicycle driver may normally start driving under the low speed-ratio transmission condition, and that upon increase of driving speed the transmission condition may be changed-over to the high speed-ratio transmission condition. It will also be seen that the bicycle driver may, if desired, effect change-over of speed-ratio by manually changing-over the desired sprocket wheel of different number of teeth.

The invention has been described with respect to two preferred specific embodiments. It is apparent that modification may be made by those skilled in the art without departing from the scope of the invention as embraced by the appended claim. As an example, instead of arranging the ratchet wheel 53 and the cooperating pawls 51 between the sprocket wheel carrier 15' and the internal gear 25', these may be arranged between the planet carrier and the driven member. The relative position of the pawl 45 and the ratchet wheel 43 may be reversed. The race cone 3 and the sun gear 20' may be formed integral with the dead axle 1. The internal gear 25' may be spline connected with the sprocket wheel carrier 15'.

What we claim is:

1. In a multiple speed bicycle transmission having in combination a multi-stage change speed free wheel equipped with a semiautomatic change-over mechanism and having a plurality of driving sprocket wheels having a different number of teeth mounted on a sprocket wheel carrier to be selectively put into operation being engaged by a driving chain, a hub and a rear dead axle passing through said hub, the improvement wherein said semiautomatic change-over mechanism comprises:

(a) a driven member detachably connected to said hub,
   (b) bearing means for rotatably supporting said driven member and said sprocket wheel carrier, respectively,
   (c) a planetary gear mechanism between said driven member and said sprocket wheel carrier consisting of an internal gear, a plurality of planetary pinions, and a sun gear fixedly secured to said axle,
   (d) a ratchet gearing mounted to directly transmit the rotation of said driving sprocket wheel to said hub,
   (e) a second ratchet gearing mounted to transmit the rotation of said driving sprocket wheel with a change in speed through said planetary gear mechanism to said hub,
   (f) one of said gearings being a high speed-ratio transmission ratchet gearing consisting of a ratchet wheel and a pawl,
   (g) oscillatable centrifugal governor weights positioned to act on said pawl responsive to the driving speed of the bicycle, and
   (h) a tip of one of said centrifugal governor weights being adapted, when the driving speed of said bicycle is comparatively low, to be engaged with an inner surface of said pawl thereby to release said pawl from engagement with said ratchet wheel, and when said bicycle is running at a comparatively high speed sufficient to permit said centrifugal governor weights to act, to be disengaged from said surface of said pawl thereby to establish engagement of said pawl with said ratchet wheel.

2. In a multiple speed bicycle transmission as set forth in claim 1, wherein said planetary pinions are supported by a gear carrier fixedly secured to said sprocket wheel carrier, said ratchet wheel of said high speed-ratio transmission ratchet gearing is formed in said internal gear meshing with said planetary pinions, said pawl engageable with said ratchet wheel is mounted to said driven member, and said centrifugal governor weights are oscillatably mounted to said driven member.

3. In a multiple speed bicycle transmission as set forth in claim 1, wherein said centrifugal governor weights are associated with said first ratchet gearing consisting of said ratchet wheel and said pawl and are oscillatably mounted to the same member as said pawl, and said second ratchet gearing is disposed between said sprocket wheel carrier and said internal gear to transmit the rotation of said driving sprocket wheel with reduction in speed through said planetary gear carrier to said driven member.

References Cited

UNITED STATES PATENTS

| 2,108,941 | 2/1938 | Morgan | 742—217 |
| 3,143,005 | 8/1964 | Schwerdhofer | 74—752 |
| 3,180,167 | 4/1965 | Paschakarnis | 74—752 X |
| 3,362,238 | 1/1968 | Hayashi et al. | 74—217 |
| 3,369,429 | 2/1968 | Kimpflinger et al. | 74—752 |
| 3,388,617 | 6/1968 | Nelson | 74—752 |

ARTHUR T. McKEON, Primary Examiner